July 17, 1928.

A. J. WEATHERHEAD, JR 1,677,740

COMBINED VALVE AND PIPE COUPLING

Filed April 13, 1927

Inventor

A. J. Weatherhead Jr.

By Fisher, Moser & Cook

Attorney

Patented July 17, 1928.

1,677,740

UNITED STATES PATENT OFFICE.

ALBERT J. WEATHERHEAD, JR., OF CLEVELAND, OHIO.

COMBINED VALVE AND PIPE COUPLING.

Application filed April 13, 1927. Serial No. 183,371.

The present invention involves a valve which is particularly constructed to permit economical production and convenient assembly of the valve parts, and a liquid-tight detachable connection with a pipe. Valves of this type may be usefully employed in the gasoline or oil feed line of an automobile engine and while primarily designed and intended for that use it is obvious that such valves may also be used advantageously in connection with any other apparatus or appliance requiring a valved supply or drain pipe connection.

Figure 1:
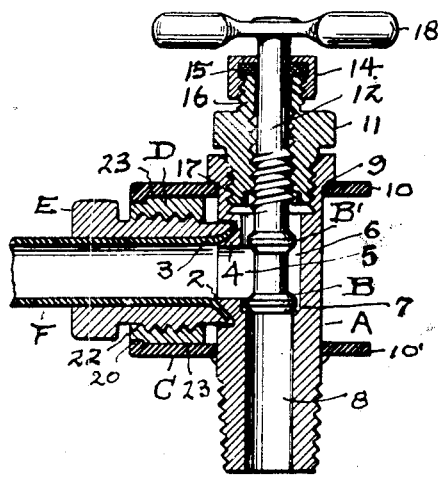
Figure 2:
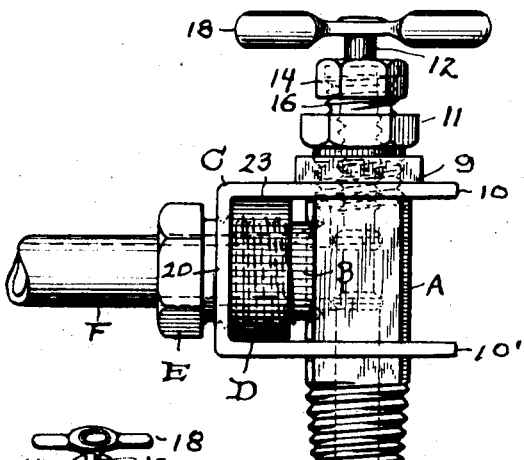
Figure 3:
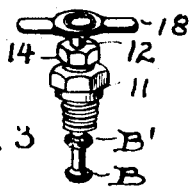
Figure 4:
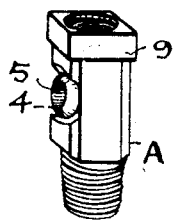
Figure 5:
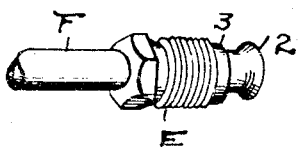
Figure 6:
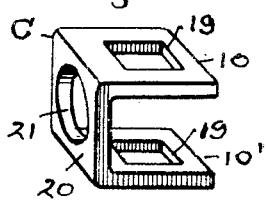
Figure 7:
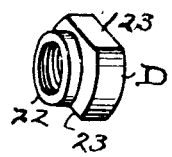

In the drawing annexed hereto, Fig. 1 is a sectional view of my improved valve and pipe connection, and Fig. 2 is a side elevation thereof. Fig. 3 is a perspective view on a smaller scale, of one of the valve units, and Fig. 4 is a perspective view of the valve body to which said unit is attached. Fig. 5 is a perspective view of the pipe and coupling unit; Fig. 6 a perspective view of the coupling yoke; and Fig. 7 a perspective view of the coupling collar or clamping gland which is inserted within the yoke.

The invention comprises a main valve body A, a controlling valve member B extending into said body, a coupling yoke C sleeved upon said body, a clamping gland or collar D secured within said yoke, and a coupling nut E sleeved upon a pipe F, said nut having its screw-threaded part extending through collar D into clamping engagement with the flaring mouth or flanged end 2 of said pipe. The flaring mouth end 2 of the pipe is clamped by the internally beveled tip 3 of nut E against a shallow cone 4 which is formed within one flat side of flat-sided body A, and a central passage 5 within cone 4 communicates with a chamber 6 centrally within body A adjacent an annular valve seat 7 which is open to an axial passage or bore 8 in one end of said body. This end of body A may be screw-threaded externally to permit attachment of the device to a receptacle, or other appliance or part into which, or from which, a fluid is to be delivered. The opposite end of body A may have an enlargement or shoulder portion 9 against which one leg 10 of the yoke may bear and be confined when it is sleeved over the body; and a supporting nut 11 for the screw-threaded stem 12 of valve member B is screw-connected with the enlarged end of body A. A screw cap 14 containing packing 15 is sleeved over the valve stem and screw-connected with a short screw-threaded extension 16 on nut 11, but this cap and packing may be omitted if desired, inasmuch as the inner end of stem 12 is provided with a second valve member B' at a predetermined distance from its main valve seating member B, and which second member B' is adapted to be brought into sealing union with a sharp corner edge 17 on nut 11 when the main valve is moved apart from main valve seat 7 and the main passage is opened. A handle 18 is affixed to the outer end of valve stem 12, and when nut 11 is detached from body A the controlling stem and its parts are removed therewith as a single unit.

Body A is preferably produced by automatic screw-machine operations, from flat-sided stock, such as square brass rods, and the truncated cone 4 containing passage 5 is produced within one flat side wall of the body so that its tip does not extend beyond the plane surface of that side, thereby permitting yoke C in assembling the parts to slip freely lengthwise of the body until checked by the enlargement or shoulder 9. Yoke C is made of flat stock and its parallel legs 10—10' are punched with registering openings 19—19, either square, flat sided, or any other shape, and these openings may be large enough to provide a loose fit for the yoke over body A. As shown the square sides of openings 19 prevent rotatable movement of the yoke in respect to the body and serve to align the pipe axially in respect to cone 4 and passage 5, thus the flat connecting portion 20 of the yoke is formed with a central round opening 21 which is adapted to be placed axially co-incident with the axis of passage 5 in cone 4 when the yoke is sleeved upon body A against stop shoulder 9. A round boss 22 on clamping collar D fits within opening 21 and the flat head of this collar bears against the inner face of connecting portion 20 to take the end thrust, and the edge of the head of this collar is flattened at two places 23—23 to fit against the inner faces of the flat legs 10—10' to prevent collar D from turning when nut E is screwed therein.

In making a connection with pipe F, nut E is first slipped over the end of the pipe and the mouth of the pipe flanged to the same flaring shape or approximately, as cone 4 and the mouth of nut E. Assuming yoke C to be in place upon body A, nut E is then entered into collar D and screwed toward body A until the flaring end of pipe F is wedged tightly over cone 4. Screwing the nut home not only seals the end of the pipe but it also locks body A and yoke C tightly together, thereby providing a unitary structure which serves as an efficient valved coupling member for the pipe. As shown in the drawings, pipe F is a relatively thin copper pipe which is flared at its end and adapted to be clamped against the cone 4 by a separate nut E. In attaching a heavy pipe the nut E may be omitted, providing the pipe itself is screw-threaded and adapted to screw directly into collar D. In that case the end of the pipe would be formed with an internal flare to fit the cone 4 and seal the joint in screwing the pipe into collar D.

What I claim, is:

1. A combined valve and pipe coupling, comprising a body having longitudinal and lateral passages, a valve member extending into said body adapted to control the flow of a fluid through said passages, and a separate member sleeved over said body in axial alignment with said valve member, said separate member having a tubular nut adapted to clamp a pipe against said body in open communication with said lateral passage.

2. A combined valve and pipe coupling, comprising a body having connecting fluid passages, a conical seat for clamping a pipe in sealing union with said body and in open communication with said passages, means adapted to be sleeved over said body and to clamp one end of said pipe against said conical seat, and a valve member within said body adapted to control said passages having an operating stem axially aligned with said clamping means and said body and extending through one end of said body.

3. A combined valve and pipe coupling, comprising a body having a longitudinal passage and a side passage, a valve member adapted to open and close communication between said passages, a conical seat formed at one side of said body at the outer end of said side passage, a yoke centrally aligned with said valve member and affixed to said body having a screw-threaded opening axially co-incident with said side passage and conical seat, and a tubular nut extending through said opening adapted to sleeve upon and clamp the end of a pipe against said conical seat.

4. A combined valve and pipe coupling, comprising a body having passages, a valve within said body controlling communication between said passages and having an outwardly extending operating stem, a yoke sleeved upon said body in axial alignment with said stem, a screw-threaded collar mounted within said yoke, and a tubular nut extending through said collar adapted to sleeve upon and clamp one end of a pipe against said body opposite the mouth of one of said passages.

5. A combined valve and pipe coupling, comprising a body having passages, an outwardly extending valve member within said body controlling said passages, a yoke sleeved upon said body in axial alignment with said valve member and locked against independent rotation thereon, and a tubular nut carried by said yoke adapted to clamp one end of a pipe against the side of said body in open communication with the mouth of one of said passages.

6. A combined valve and pipe coupling, comprising a body having a flat side wall and longitudinal and lateral passages, an outwardly extending valve member adapted to control communication between said passages, a conical seat at one side of said body at the mouth of the lateral passage, a yoke having openings permitting said yoke to be sleeved in axial alignment with said valve member in non-rotatable connection with said body, and means carried by said yoke adapted to clamp one end of a pipe against said conical seat.

7. A combined valve and pipe coupling, comprising a body having a longitudinal passage, a valve member within said passage having an operating stem extending beyond one end of said body, a nut supporting said stem, said body having a lateral passage and a conical seat at the mouth of said passage, a yoke sleeved upon said body in axial alignment with the stem of said valve member, a collar fixed within said yoke having a screw-threaded opening opposite said conical seat, and a tubular nut extending through said collar adapted to clamp one end of a pipe against said conical seat, thereby locking said yoke and body together.

8. A combined valve and pipe coupling, comprising a body having a longitudinal passage and a valve seat within said passage, a nut at one end of said passage, a valve member adapted to engage said seat having a screw-threaded stem extending through said nut, said body having a passage in its side and a conical seat at the mouth of said passage, a second body part sleeved upon said body in axial alignment with said screw-threaded stem, said body having a stop shoulder to fix the position of said part, and a tubular nut carried by said second body part and adapted to clamp one end of a pipe against said conical seat.

In testimony whereof I affix my signature.

ALBERT J. WEATHERHEAD, Jr.